United States Patent
Furuhata et al.

(10) Patent No.: US 6,226,405 B1
(45) Date of Patent: May 1, 2001

(54) METHOD AND APPARATUS FOR UPDATING NODE POSITION

(75) Inventors: Tomotake Furuhata, Yokohama (JP); Ko Hsiu Hou; Kenji Shimada, both of Pittsburgh, PA (US); Atsushi Yamada, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,582

(22) Filed: Dec. 18, 1998

(51) Int. Cl.[7] .............................. G06K 9/48; G06K 9/46; G06T 11/00
(52) U.S. Cl. ........................ 382/197; 382/203; 345/433
(58) Field of Search ..................... 382/190, 195, 382/201, 202, 203, 197; 345/438, 439, 433

(56) References Cited

U.S. PATENT DOCUMENTS

| | | | |
|---|---|---|---|
| 5,133,052 | * | 7/1992 | Bier et al. ............................ 707/530 |
| 5,237,647 | * | 8/1993 | Roberts et al. ...................... 345/419 |
| 5,559,901 | * | 9/1996 | Lobregt ................................ 382/256 |
| 6,046,744 | * | 4/2000 | Hoppe .................................. 345/419 |

FOREIGN PATENT DOCUMENTS

| | | |
|---|---|---|
| 1-124062 | 5/1989 | (JP). |
| 1-125671 | 5/1989 | (JP). |
| 10-69549 | 3/1998 | (JP). |

OTHER PUBLICATIONS

Computer Graphics, 26, 2, Jul. 1992, "Variational Surface Modeling" pp. 157–165, W. Welch et al.
Computer Graphics Proceedings, Annual Conference, 1994, "Free–Form Shape Design Using Triangulated Surfaces", p. 247–256, W. Welch et al.
Computer Graphics, 26, 2, Jul. 1992, "Surface Modeling with Oriented Particle Systems", p. 185–194, R. Szeliski et al.
Computer Aided Design, vol. 20, No. 1, Jan./Feb. 1988, K. Ho–Le "Finite Element Mesh Generation Methods: A Review and Classification" pp. 27–38.
Computer Graphics, vol. 25, No. 4, Jul. 1991, Deformable Curve and Surface Finite–Elements for Free–Form Shape Design, G. Celniker.

* cited by examiner

*Primary Examiner*—Amelia Au
*Assistant Examiner*—Mehrdad Dastouri
(74) *Attorney, Agent, or Firm*—McGuireWoods, LLP; Stephen C. Kaufman, Esq.

(57) ABSTRACT

In order to change the positions of a plurality of nodes that constitute a line or a surface, following steps are executed: storing in a storage device data of a normal for each node; changing the position of each node and storing the position information into the storage device by (1) defining a virtual elastic member connected to each node in a direction of the normal of each node, and (2) stretching or shrinking the elastic members in the direction of each normal so as to balance each elastic member; and repeating the storing step and the changing step until a predetermined condition has been satisfied. As a result, a smooth curve or smooth surface is generated.

7 Claims, 5 Drawing Sheets

METHOD AND APPARATUS FOR UPDATING NODE POSITION

BACKGROUND OF THE INVENTION

1. Field of the Invention

The present invention relates to the generation of a curve using a string of nodes, or of a surface using a mesh that includes a set of nodes.

2. Related Art

In the VRML, CAD and CG fields, there is a demand to represent a smooth curve or smooth surface, using a mesh, such as a triangular or a quadrilateral mesh, that is defined as a set of linear elements.

For example, in a case that the three-dimensional contents of the Web is generated as VRML data, the free shape is expressed mainly by using a mesh of triangles. If a smooth shape, such as the hand or the face of a human being is to be generated, it is difficult to determine each position of the mesh nodes. If the position of a specific node is fixed, it is preferable that the positions of the other nodes be so determined that they interpolate the fixed node.

The surface used for a CAD field is frequently expressed by using a parametric surface, such as NURBS (Non-Uniform Rational B-Spline). On the other hand, since the parametric surface that is mainly employed has a quadrilateral structure, there are such shapes for which it is difficult to generate a parametric surface because of topological restrictions. A fillet for rounding the corners of a mechanical part is one of such examples. It is easier for this shape to generate a smooth surface using a mesh.

In addition, in the CAD field, a wire frame, that is a line drawing, may first be input to a computer because it is difficult to input a desired surface directly. In this case, a method is required for generating a surface the inside of which can be smoothly interpolated from the input wire frame.

A problem that occurs during the generation of a smooth curve or surface is concerned with the provision of an adequate definition of force and a determination of under what condition the force is balanced. According to the normal method, the initial coordinate of the node is updated by repeatedly performing calculations to obtain a final shape. The property and the superiority of an algorithm are determined depending on how the force is defined.

In other words, which model of the force should be defined and which algorithm should be used to obtain a state where the force is balanced is all about in a method for generating a smooth curve or surface.

Several methods have been proposed for generating a smooth curve or curved surface by minimizing strain energy on the curved surface (see "Deformable Curve And Surface Finite-Elements For Free-Form Shape Design," G. Celiniker and D. Gossard, Computer Graphics, Vol. 25, No. 4, pp. 257–266, 1991; "Variational Surface Modeling," W. Welch and A. Witkin, Computer Graphics, Vol. 26, No. 2, pp. 157–166, 1992; or "Free-Form Shape Design Using Triangulated Surfaces," W. Welch and A. Witkin, Computer Graphics Proceedings, pp. 247–256, 1994). According to these methods, the presence of a surface inside a triangular element is assumed. Then, for the entire element, integral calculations are performed for the force applied at individual points on the surface, and the internal energy is obtained. Following this, the shape of the surface which causes the internal energy to be minimum is calculated. However, the methods for evaluating the values for the energy across the inside of the triangular elements generally require an extended period of time, compared with a discrete method for evaluating values for only nodes.

As one method for evaluating values for only nodes, there is a procedure called Laplacian smoothing that is frequently employed in order to improve the quality of an FEM mesh (see "Finite Element Mesh Generation Methods: A Review And Classification," K. Ho-Le, Computer Aided Design, Vol. 20, No. 1, 1988). This is a method for repeating a process for moving the position of each node to the center of gravity of a polygon that is constituted by adjacent nodes. This method is characterized in that a surface is generated that is so shaped as to satisfy a designated constraint condition and to minimize the dimensions. However, if, for example, nodes on the boundary of a meshed region are fixed and a node at the center of the region is fixed to a specific position, a surface that has a sharp tip at the center of the region is generated, so that this method can not be used to generate a smooth curve or surface. The constraint condition that can be provided is limited to the restriction of a position, and the normal can not be provided as a constraint condition.

As another method for evaluating values only at discrete points, proposed is "Surface Modeling With Oriented Particle Systems," R. Szeliski and D. Tonnesen, Computer Graphics, Vol. 26, No. 2, pp. 185–194, 1992. To briefly explain this method, the stretching force, which is exerted by a spring to minimize the dimensions of a surface, and the bending force, which is exerted by a spring to flatten the surface in the vicinity of each node, act on the individual nodes by multiplying them by weighing coefficients. The weighing coefficients are considered as one type of the degree of freedom to obtain the shape. However, which shape is obtained by using which weighing coefficient is not intuitive. If the weighing coefficient is zero relative to the stretching spring and only the bending spring acts on the nodes, only the force for flattening the shape in the vicinity of nodes is applied, and the shape will be dispersed infinitely. If the weighing coefficient is zero relative to the bending spring and only the stretching spring acts on the nodes, a sharp tip occurs at the node whose constraint condition is the same as in the Laplacian smoothing. In order to generate a smooth surface, an adequate weighing coefficient must be determined. However, this paper contains no description of how this may be accomplished.

Disclosed in Japanese Published Unexamined Patent Application No. Hei 1-125671 and No. Hei 1-124062 are techniques in which attributes that correspond to a mass and an electric charge are defined at the individual nodes of a surface; as force types, a field force such as the gravity, a mutual reaction between the sources of the force such as electric charges, and elastic force such as a spring are also defined; and the positions of the points are defined by balancing these forces so that the shape of the surface is determined. According to this technique, the spring is set between one or more specific points and the individual points that form the surface. No other conditions are described in these publications.

Disclosed in Japanese Published Unexamined Patent Application No. Hei 10-69549 is a technique comprising the steps of: pasting a mesh to an image; determining spring coefficients for springs that connect the nodes of the mesh; determining spring coefficients for the springs that share the mesh nodes and the rotation springs which define an angle between springs; calculating a matrix for a balanced equation for each spring and a matrix for an overall spring balanced equation; inputting transformation control information and transforming the spring balanced equations in accordance with that information; obtaining the positions of mesh nodes after the transformation and calculating an interpolation expression for the coordinate transformation for each mesh element; and obtaining a deformed image. However, no idea in which a spring is set in the normal direction of the mesh point is disclosed.

SUMMARY OF THE INVENTION

It is therefore one object of the present invention to change the positions of a plurality of nodes in order to generate a smooth curve or surface.

It is another object of the present invention to generate a smooth curve or a surface that satisfies a given condition, such as a passing point.

In a first aspect of the present invention, to change the positions of a plurality of nodes that constitute a line or a surfaces, following steps are executed: storing in a storage device data of a normal at a node; changing the position of the node and storing the position information into the storage device by (1) defining a virtual elastic member connected to the node in the direction of the normal of the node, and (2) stretching or shrinking the elastic member in the direction of the normal; and repeating the storing step and the changing step for predetermined nodes until a predetermined condition has been satisfied. By defining an elastic member (e.g., a spring) in a direction of the normal of a node, and stretching or shrinking it, a smooth curve or surface can be obtained. The storage device here is, for example, the main memory of a computer.

The above changing step may include a step of further changing the position of the node so as to correct distribution of the nodes. This is done in order to generate a smoother curve or surface. This processing can also be performed in a second aspect of the present invention, which will be described later.

In a case of a line, the normal may include a binormal and a primary normal, and elastic members may be defined in directions of both binormal and primary normal. This is because for a three-dimensional curve there are two normals, while for a planar curve there is only one normal. This processing can also be performed in the second aspect of the present invention.

In the above process of stretching and shrinking the elastic member in the direction of the normal, a displacement of the elastic member can be calculated by employing position information of a reference node and position information of the node, wherein the reference node has a predetermined positional relationship with the node. The reference node is a node which influences the node to be moved. This processing can be performed in the second aspect of the present invention. In the preferred embodiment of the present invention, the reference node is adjacent to the node to be moved. However, this invention does not limit to only adjacent nodes.

In the above process of stretching and shrinking the elastic member in the direction of the normal, position information of a point on a first line may be also employed, wherein at the point a distance between the first line and a second line is shortest, and the first line passes the node and is parallel to the normal of the node, and the second line passes the reference node and is parallel to the normal of the reference node. This processing can also be performed in the second aspect of the present invention.

The first aspect of the present invention may further comprise a step of designating as a constraint condition a normal of a specific node, wherein in the changing step, a normal of the specific node is fixed to the designated constraint condition. Thus, a curve or a surface that satisfies a predetermined condition can be generated. This process can also be performed in the second aspect of the present invention.

In the second aspect of the present invention, to change the positions of a plurality of nodes that constitute a line or a surface, following steps are executed: storing in a storage device data of a normal for each node; changing the position of each node and storing the position information into the storage device by (1) defining a virtual elastic member connected to each node in a direction of the normal of each node, and (2) stretching or shrinking the elastic members in the direction of each normal so as to balance each elastic member; and repeating the storing step and the changing step until a predetermined condition has been satisfied. As a result, a smooth curve or surface can be generated.

In the above process of stretching or shrinking the elastic members in the direction of each normal, a distance between a point A and a certain node and a distance between a point B and a specific node may be employed in which a first line passes the certain node and is parallel to the normal of the certain node, and a second line passes the specific node and is parallel to the normal of the specific node, and a distance between the first and second lines is shortest at the point A on the first line, and a distance between the first and second lines is shortest at the point B on the second line. The displacement of the elastic member is determined by using the length of the elastic member as a reference. This process can also be performed in the first aspect of the present invention.

In the first and second aspect of the present invention, a displacement of the elastic member may be calculated by using position information of a reference point which has a predetermined positional relationship with the node and position information of the node, in the above process of stretching or shrinking the elastic members in the direction of each normal. The reference point can be a node or a point located on the edge of a mesh in case of a smooth surface generation.

According to the first and the second aspects of the present invention, in case of a smooth surface generation, the above changing step may include a process for further defining a virtual elastic member connected to a predetermined edge of the mesh in a direction of the normal of the edge, and stretching or shrinking the elastic members defined for individual nodes in the direction of each normal so as to balance each elastic member, taking into account force exerted by the elastic member connected to the edge.

The above described processing can be implemented as a dedicated apparatus, and a program for a computer. Furthermore, this computer program is stored on a storage medium, such as a CD-ROM, a floppy disk or an MO (Magneto-optic) disk, or in a storage device such as a hard disk.

DETAILED DESCRIPTION OF THE PRESENT INVENTION

The present invention includes a method for generating a smooth curve using a sequence of nodes, and a method for generating a smooth surface using a group of nodes in a mesh. An elastic member (e.g., a spring) used for both methods is defined likewise. The definition of the elastic member will now be explained.

Figure 1:
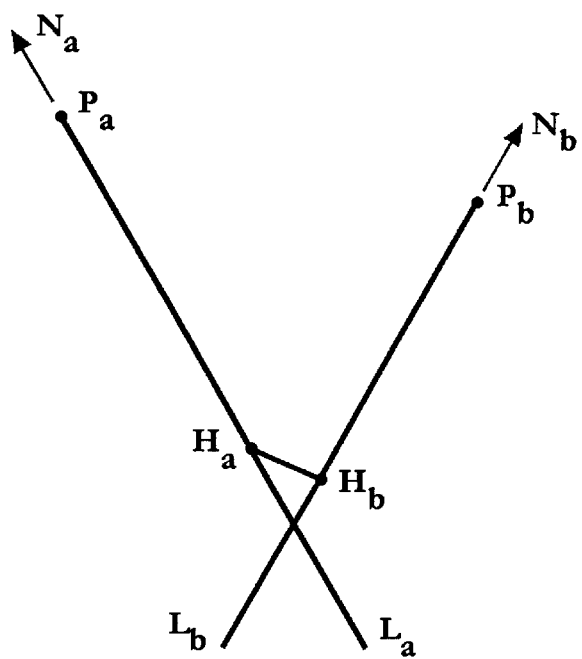
FIG. 1 is a diagram for explaining the basic principle of the present invention.

Basically, in case that a smooth curve is approximated by a sequence of nodes, if nodes are distributed at a sufficiently high density, a satisfactory precision can be achieved by using arcs. For a surface, as well as for a curve, if the nodes in the mesh are distributed at a sufficiently high density, a satisfactory precision can be attained by connecting the nodes by the arc. The elastic member that will be explained below acts on each node so that a side forms an arc. FIG. 1 shows the state where an elastic members are defined for two nodes. In FIG. 1, unit normal vector Na at node Pa, and unit normal vector Nb at node Pb are calculated. Line La, which runs parallel to the unit normal vector Na and passes through node Pa, is an elastic member for node Pa, and line Lb, which runs parallel to the unit normal vector Nb and passes through node Pb, is an elastic member for node Pb. Points Ha (a point on line La) and Hb (a point on line Lb) are so determined that the distance between points Ha and Hb is the shortest, and an interval between point Ha and node Pa, and an interval between point Hb and node Pb are employed as elastic members.

If the lines La and Lb intersect each other, the intersection serves as point Ha and also as point Hb. The employment of such a point that the distance between lines La and Lb is the shortest is only an example.

An elastic member may be defined as an interval between node Pa and a point on line La that is located apart from point Ha at a predetermined distance. As will be described later, one unit normal vector is present for the generation of a curve on a plane, two vectors are present for the generation of a curve in three dimensional space, and one vector is present for the generation of a surface. The processing performed when two vectors are present will be described later.

Forces Fa and Fb exerted by the elastic members that act on nodes Pa and Pb are defined as follows.

$Fa=Ka*|Pa-Ha|*Na$ $Fb=Kb*|Pb-Hb|*Nb$ where Ka and Kb are scalar values that represent an elastic coefficient, where |V| is a scalar value that represents the length of vector V, and where Na and Nb are previously mentioned unit normal vectors.

Thus, it is apparent that the forces are exerted on nodes Pa and Pb along the normals of the nodes. If |Fa|=|Fb|, nodes Pa and Pb are located at positions that are balanced by the forces of the elastic members. If the elastic coefficient is Ka=Kb, the elastic members are balanced if |Pa−Ha|=|Pb−Hb|, i.e, if the distance between point Ha and node Pa is equal to the distance between point Hb and node Pb.

If node Pb can be freely moved under the condition where the position of node Pa is fixed, node Pb is moved along the direction of the unit normal Nb so that Kb|Pb−Hb|=Ka|Pa−Ha|. That is, the elastic member is stretched or shrunk along the direction of the normal. If Kb=Ka, node Pb is moved along the direction of the unit normal Nb so that the elastic member becomes as long as the interval between point Ha and node Pa.

Figure 2:
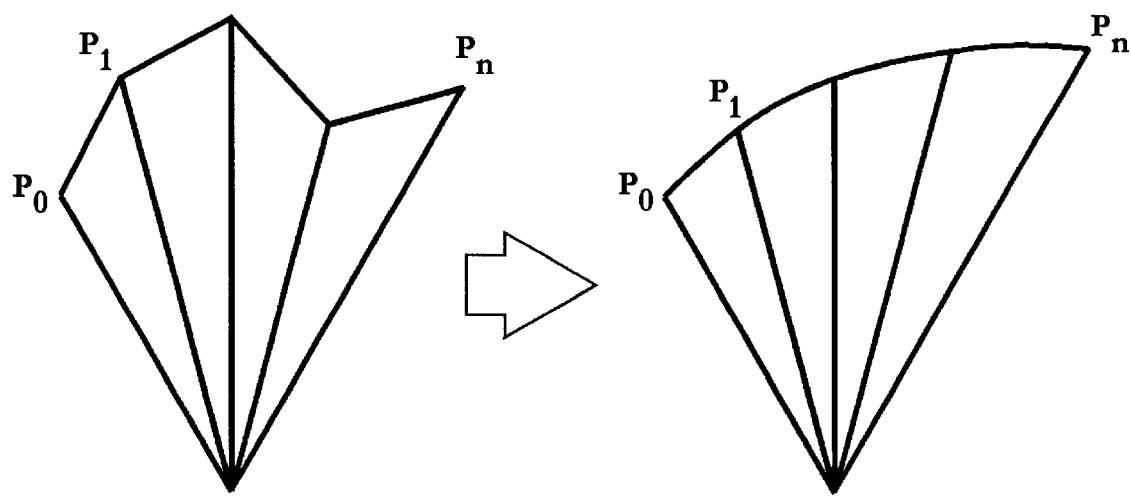
FIG. 2 is a diagram for explaining the basic principle of the present invention.

An explanation will be given for an example for generating a smooth curve if there is a sequence of nodes $P_0$ to $P_n$ as shown on the left in FIG. 2. To simplify the explanation, the unit normal of all the nodes are supposed to intersect at one point. Also assume that the positions of nodes $P_0$ and $P_n$ which are located at the both ends are fixed and that the remaining nodes $P_1$ to $P_{n-1}$ can be freely moved. If the elastic members defined above act on the adjacent nodes, the forces are balanced in the state shown on the right in FIG. 2. That is, if the defined elastic members act on the nodes, a sequence of nodes that forms a smooth curve can be generated from not smooth sequence of nodes $P_0$ to $P_n$.

With an assumption of the above definition of the elastic member, an explanation will be given for a method for generating a smooth curve using a sequence of nodes and a method for generating a smooth surface using a node group in a mesh.

Method for Generating a Smooth Curve Using a Sequence of Nodes

Figure 3:
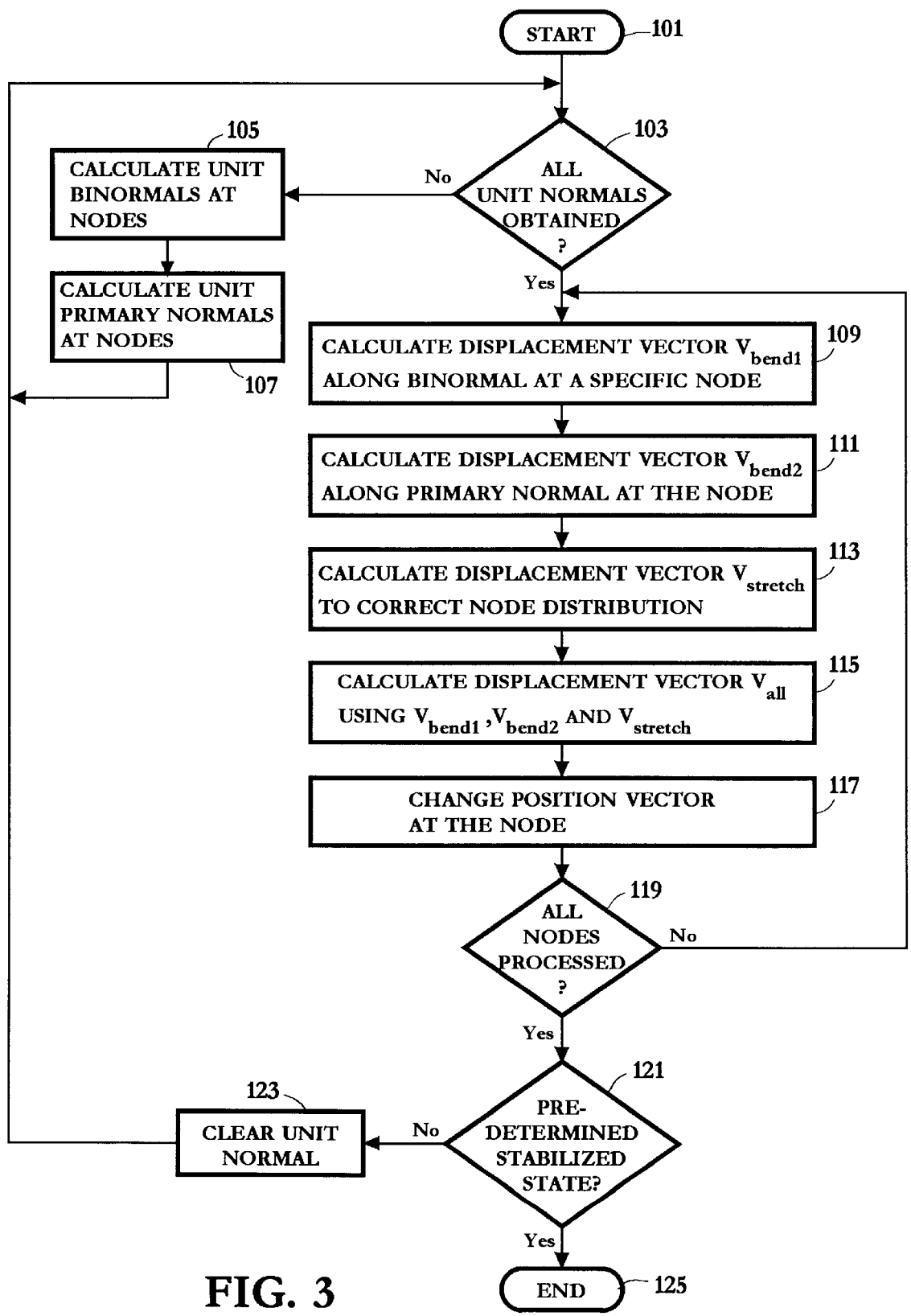
FIG. 3 is a flowchart showing the processing for generating a smooth curve.

Position information for string of nodes $P_0$ to $P_n$ is stored in advance in a storage device. The sequence of nodes $P_0$ and $P_n$ may be either closed or open. If the node sequence is closed, it is assumed that node $P_n$ is adjacent to node $P_0$. A high level flowchart is shown in FIG. 3.

This processing is roughly divided into three portions. Steps 103 to 107 are the normal calculation portion, steps 109 to 119 are the node position change portion, and step 121 to 123 are the termination control portion. This step division scheme is merely an example, and steps 109 to 117 may be the node position change portion while step 119 may be the control portion for the node position change portion.

Figure 4:
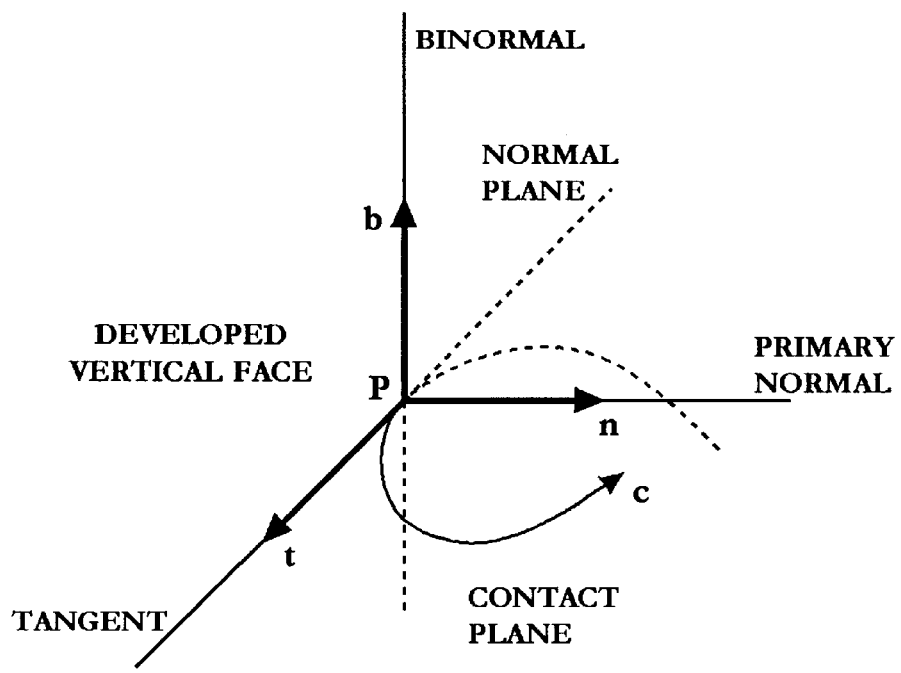
FIG. 4 is a diagram showing the relationship between a binormal and a primary normal.

The normal calculations will be described first. Until all the unit normals have been obtained (step 103), repetitive calculations are performed for the unit binormals and the unit primary normals of nodes (steps 105 and 107). The results of the calculations for individual nodes are stored in the storage device. Relative to a curve c, in three dimensional space the binormal n and the primary normal b have the directions shown in FIG. 4. These two normals are shown because in the example the curve c is described in three-dimensional space; were the curve c described in two dimensional space only the primary normal would be shown, and step 105 would not be required.

The specific calculations performed for the unit binormal (step 105) will be explained. Since a curve in this example is expressed by a folded line that is formed by a node sequence, a precise unit binormal can not be obtained. Therefore, a pseudo-unit binormal is calculated using adjacent nodes. However, as the calculation is repeated, the pseudo-unit binormal gradually approximates the unit binormal of a generated smooth curve. The following calculation method is merely an example, and another method for calculating a unit binormal may be employed.

In case of calculation of unit binormal $B_i$ at node $P_i$, a plane that passes through node $P_i$ and its adjacent nodes $P_{i-1}$ and $P_{i+1}$ is determined, and the unit normal of the plane is defined as the unit binormal at node $P_i$. If these three nodes are located on the same line and the unit binormal can not be obtained, another adjacent node is employed to determine the unit binormal. If all the nodes are positioned along the same line, the unit binormal can not be determined, and a zero vector is regarded as the unit binormal.

Figure 5:
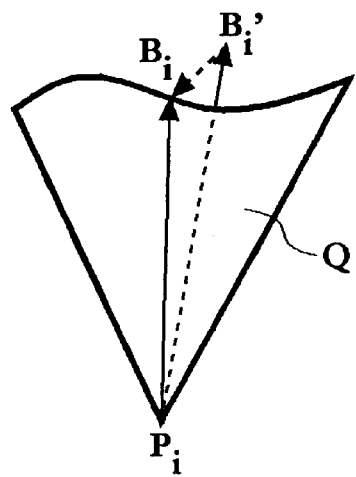
FIG. 5 is a diagram showing an example for the constraint condition for a normal with two degrees of freedom.

If the unit binormal or the unit tangent are set as a constraint condition for a node for which the unit binormal is to be calculated, the above processing is not performed. If a unit binormal is designated as the constraint condition, this line is defined as the unit binormal for that node. A designation method having zero degrees of freedom and a designation method having one degree of freedom are used to designate the normal. According to the method that has zero degrees of freedom, a normal itself is designated, and according to the method that has one degree of freedom, a face (a plane or a curved surface) is designated whereat the normal can exist. While a normal can thus be designated with zero degrees of freedom, with one degree of freedom a tentative unit binormal ($B'_i$ in FIG. 5) is calculated using the above method, and the tentative unit binormal $B'_i$ is moved the shortest distance to a designated face Q, and unit vector $B_i$ at the destination is defined as the unit binormal of the node.

If the unit tangent is designated as the constraint condition, (1) the tentative unit binormal is calculated using the above method; (2) the unit primary normal is calculated as the outer product of the designated unit tangent and the tentative unit binormal; and (3) the unit binormal is calculated as the outer product of the unit primary normal and the designated unit tangent.

The calculation of the unit primary normal (step 107) will now be explained. As well as the calculation for the binormal, a calculation for a pseudo-primary normal is performed. Each time the calculation is repeated, the pseudo-primary normal more nearly approximates the actual primary normal that is generated for a smooth curve. The following method for performing the calculation is merely an example, and another method can be used.

In case of calculation of unit primary normal $N_i$ at node $P_i$, first, unit binormal $B_i$ is calculated. This binormal $B_i$ is obtained at step 105. Then, vector $Z_{i-1}$ is calculated as the outer product of vector $P_i - P_{i-1}$ and unit binormal $B_i$, while vector $Z_{i+1}$ is calculated as the outer product of vector $P_{i+1} - P_i$ and unit binormal $B_i$. If the unit binormal is a zero vector, $Z_{i-1}$ and $Z_{i+1}$ are also zero vectors. If node $P_i$ is a node at the end of the node sequence that is opened, either $Z_{i-1}$ or $Z_{i+1}$, where no adjacent node is present, is defined as a zero vector. The thus obtained $Z_{i-1}$ and $Z_{i+1}$ are employed to calculate the unit primary normal as follows.

$$N_i = (Z_{i-1} + Z_{i+1}) / (|Z_{i-1} + Z_{i+1}|),$$

or $$N_i = (Z_{i-1}/|Z_{i-1}| + Z_{i+1}/|Z_{i+1}|) / (|Z_{i-1}/|Z_{i-1}|) + (Z_{i+1}/|Z_{i+1}|)|)$$

The first equation is for the unit primary normal if $Z_{i-1}$ and $Z_{i+1}$ are added together while taking their sizes into account. The second equation is for the unit primary normal if unit vectors having directions of $Z_{i-1}$ and $Z_{i+1}$ are added together. It should be noted that if the vector of the denominator in the first and second equations is a zero vector, the unit primary normal $N_i$ is also defined as a zero vector.

The above described method for calculating the unit primary normal is performed for a node for which the constraint condition of the unit primary normal or the unit tangent is not designated. If the unit primary normal itself is designated as the constraint condition for the node, the designated unit primary normal is used as the unit primary normal for the pertinent node when performing the succeeding calculation. As methods to be used for designating the normal, there are a method having zero degrees of freedom and a method having one degree of freedom. According to the method having zero degrees of freedom, a normal itself is designated, and according to the method having one degree of freedom, a face (a plane or a curved surface) is designated on which the normal can exist. While the normal is thus obtained with zero degree of freedom, with one degree of freedom the tentative unit primary normal is calculated using the above method, and the tentative unit primary normal is moved the shortest distance to a designated face, the unit vector at the destination being defined as the unit primary normal at the node.

If the unit tangent is designated as the constraint condition, (1) the tentative unit binormal is calculated using the method described at step 105; and (2) the unit primary normal is calculated as the outer product of the tentative unit binormal and the designated unit tangent.

The normal calculation portion is performed in the above described manner, and in this embodiment the node position change process is initiated after the unit normals for all the nodes are calculated. However, normals can be calculated only for nodes that are required for the node position change portion, following which the node position change portion can be initiated.

The node position change portion will now be described. First, displacement vector $V_{bend1}$ having a direction of the binormal is calculated for a specific node (step 109), and displacement vector $v_{bend2}$ having a direction of the primary normal is calculated for the specific node (step 111). Then, displacement vector $V_{stretch}$ for correcting the node distribution is calculated (step 113). Finally, vectors $V_{bend1}$, $V_{bend2}$ and $V_{stretch}$ are added together to obtain vector $V_{all}$ (step 115). A position vector for the node is changed using vector $V_{all}$ (step 117), and as a result, the position of a specific node can be changed, the results being stored thereafter in the storage device. Steps 109 to 117 are repeated until all the nodes are processed (step 119).

First, an explanation will be given for the method for calculating the displacement vector $V_{bend1}$ in the direction of the binormal (step 109). Displacement vector $Y_{i-1}$, which is generated by the force exerted by node $P_{i-1}$ that acts on node $P_i$, and displacement vector $Y_{i+1}$, which is generated by the force exerted by node $P_{i+1}$ that acts on node $P_i$, are calculated. For their calculation, the line that passes through node $P_i$ and is parallel to the unit binormal $B_i$ is defined as $L_i$; the line that passes through node $P_{i-1}$ and is parallel to the unit binormal $B_{i-1}$ is defined as $L_{i-1}$; and the line that passes through node $P_{i+1}$ and is parallel to the unit binormal $B_{i+1}$ is defined as $L_{i+1}$. Also, points that correspond to the feet at the shortest interval between lines $L_i$ and $L_{i-1}$ are defined as $H_{i1}$ and $H_{i-1}$, while points that correspond to the feet at the shortest interval between lines $L_i$ and $L_{i+1}$ are defined as $H_{i2}$ and $H_{i+1}$. Furthermore, the elastic coefficient of the elastic member at node $P_i$ is defined as $K_i$; the elastic coefficient of the elastic member at node $P_{i-1}$ is defined as $K_{i-1}$; and the elastic coefficient of the elastic member at node $P_{i+1}$ is defined as $K_{i+1}$.

At this time, $Y_{i-1}$ and $Y_{i+1}$ are as follows:

$$Y_{i-1} = (K_{i-1}|P_{i-1} - H_{i-1}| - K_i|P_i - H_{i1}|) * B_i$$

$$Y_{i+1} = (K_{i+1}|P_{i+1} - H_{i+1}| - K_i|P_i - H_{i2}|) * B_i$$

If $K_i = K_{i-1} = K_{i+1}$, $Y_{i-1}$ and $Y_{i+1}$ can be simplified as follows:

$$Y_{i-1} = (|P_{i-1} - H_{i-1}| - |P_i - H_{i1}|) * B_i$$

$$Y_{i+1} = (|P_{i+1} - H_{i+1}| - |P_i - H_{i2}|) * B_i$$

The thus obtained $Y_{i-1}$ and $Y_{i+1}$ are employed to calculate the displacement vector $V_{bend1}$, in the direction of the binormal at node $P_i$, as follows:

$$V_{bend1} = (Y_{i-1} + Y_{i+1})/2,$$

or $$V_{bend1} = (Len_{i-1} Y_{i-1} + Len_{i+1} Y_{i+1})/(Len_{i-1} + Len_{i+1})$$

$$Len_{i-1} = |P_i - P_{i-1}|,$$

and $$Len_{i+1} = |P_i - P_{i+1}|$$

The above second equation represents the calculation method that is weighted by using the distance from node $P_i$ to node $P_{i-1}$, and the distance from node $P_i$ to node $P_{i+1}$. The above described equations, however, are only examples, and the present invention is not limited to them.

Next, an explanation will be given for the method for calculating the displacement vector $V_{bend2}$ in the direction of the primary normal (step 111). This method is basically the same as the method used for calculating the displacement vector $V_{bend2}$ in the direction of the binormal. Lines $L_i$, $L_{i-1}$ and $L_{i+1}$ are parallel to the unit primary normals $N_i$, $N_{i-1}$ and $N_{i+1}$. The directions of $Y'_{i-1}$ and $Y'_{i+1}$ ("'" is added because they are not the same as those in directions along the binormals) correspond to those of the primary normals unit, instead of the directions of unit binormals. Thus, $Y'_{i-1}$ and $Y'_{i+1}$ can be described as follows:

$$Y'_{i-1} = (K'_{i-1} |P_{i-1} - H'_{i-1}| - K'_i |P_i - H'_{i1}|) * N_i$$

$$Y'_{i+1} = (K'_{i+1} |P_{i+1} - H'_{i+1}| - K'_i |P_i - H'_{i2}|) * N_i$$

Further, different elastic coefficients can be used for the binormal direction and for the primary normal direction. Thus, $K'_i$, $K'_{i-1}$ and $K'_{i+1}$ are used in the above equation. In addition, since points that are defined as feet at the shortest interval between the lines L differ from those for the binormal, $H'_{i-1}$, $H'_{i1}$, $H'_{i+1}$ and $H'_{i2}$ are employed.

$V_{bend2}$ can be represented as follows:

$$V_{bend2} = (Y'_{i-1} + Y'_{i+1})/2,$$

or $$V_{bend2} = (Len_{i-1} Y'_{i-1} + Len_{i+1} Y'_{i+1})/(Len_{i-1} + Len_{i+1})$$

$$Len_{i-1} = |P_i - P_{i-1}|,$$

and $$Len_{i+1} = |P_i - P_{i+1}|$$

The displacement vector along the binormal and the displacement vector along the primary normal are calculated by using adjacent nodes only. These vectors can also be modified while taking into account nodes that are not adjacent.

An explanation will now be given for the method for calculating displacement vector $V_{stretch}$ to correct a node distribution (step 113). If the calculation is repeated by using only vectors $V_{bend1}$ and $V_{bend2}$, the node distribution is non-uniform. The displacement vector $V_{stretch}$ is then calculated in order to correct the node distribution. The displacement vector $V_{stretch}$ is a vector in a direction of the tangent of the node, i.e., a displacement vector whose direction follows a curve. Vector $V_{stretch}$ does not include elements having directions pointing away from the curve, i.e., in directions of the binormal and of the primary normal, and it is perpendicular to vectors $V_{bend1}$ and $V_{bend2}$. Finally, it should be noted that if a sequence of nodes that is first input is roughly smooth at the beginning, a desired smooth curve can be obtained without this step being performed.

To calculate vector $V_{stretch}$ at node $P_i$, (1) a vector is obtained for moving node $P_i$ to the midpoint between the two adjacent nodes $P_{i-1}$ and $P_{i+1}$; (2) the elements along the primary normal and along the binormal are deleted from the obtained vector, and the remaining element along the tangent is defined as the displacement vector $V_{Stretch}$. This calculation can be represented by the following equations:

$$V_{stretch} = V_{c0} - V_{c1} - V_{c2}$$

$$V_{c0} = ((P_{i-1} + P_{i+1})/2) - P_i$$

$$V_{c1} = dot(V_{c0}, B_i) * B_i$$

$$V_{c2} = dot(V_{c0}, N_i) * N_i$$

where dot(V1, V2) represents the inner product of vectors V1 and V2.

It can be understood that the displacement for moving node $P_i$ to the midpoint between nodes $P_{i-1}$ and $P_{i+1}$ is a displacement obtained if a force (0 if the distance is 0) that is proportional to the distances from node $P_{i-1}$ and from node $P_{i+1}$ acts on node $P_i$. This force is not necessarily proportional to the distance, and the force need not be zero if the distance is zero. The displacement at node $P_i$ may be calculated by assuming, for example, that a non-linear spring force, such as an intermolecular force, is received from nodes $P_{i-1}$ and $P_{i+1}$.

The thus obtained displacement vectors $V_{bend1}$, $V_{bend2}$ and $V_{stretch}$ are added together to calculate the final displacement vector $V_{all}$ (step 115). The position vector at node $P_i$ is determined by adding vector $V_{all}$ to the original position vector (step 117). The position vector that has been processed at the node position change portion is stored in the storage device. However, since the original position vector could be used to calculate a new position vector for another node, the original position vector must also be stored in this case until the processing for all the nodes is completed.

A method for using a new position vector at node $P_i$, instead of using the original position vector for node $P_i$, may be employed to calculate a new position vector for another node. In this case, it may be better to re-calculate the normal.

The control portion of the node position change portion is executed at step 119. Specifically, it is checked whether the processing (steps 109 to 117) has been performed for all the nodes. In some cases, the coordinates for the nodes are designated as the constraint condition, and the node position change portion is not performed, the designated coordinates being used to represent the node positions. It should be noted that for the position constraint condition there are designation methods having zero degrees of freedom, having one degree of freedom, and having two degrees of freedom. According to the designation method having zero degrees of freedom, designated coordinate values are employed to represent the location of a node, and as as described above, the node position change portion is not required. According to the designation method having one degree of freedom, since a line along which the node can exist has been designated, the location of the node is calculated by using the previously mentioned method, and the point on the designated line that is nearest the calculated position of the node is calculated. According to the designation method having two degrees of freedom, since a face (a plane or a curved surface) is designated whereon the node can exist, the position of the node is calculated using the above described method, and the point that is located closest to the calculated position of the node and is on the designated face is obtained.

Finally, an explanation will be given for the termination control portion of the processing, i.e., steps 121 and 123. The process at step 121 concerns the termination condition for the entire processing. There can be several methods by which to set up conditions for terminating the calculations. In this embodiment, whether the magnitude of the displacement vectors $V_{all}$ for the nodes are equal to or smaller than a predetermined value is employed as a condition for terminating the calculations. In this case, either the greatest $|V_{all}|$ value available for all the nodes, or the average of all the $|V_{all}|$ values, may be employed as a reference. If either the minimum value, the maximum value, or the average value of the distance $|P_i-P_{i-1}|$ and $|P_i-P_{i+1}|$ is defined as $L_i$ for each node $P_i$, and if $D_i=|V_{all}|$ is defined, $D_i/L_i$ is obtained for each node $P_i$. The result represents the moving distance for each node that is normalized by using the distance between the nodes. If the maximum value or the average value of the normalized distances which are calculated for each node is equal to or smaller than a threshold value, it is assumed that a predetermined stabilized condition has been attained and the processing is thereafter terminated. This is only one possible processing example, however, and another reference can be used to determine when the calculations should be terminated. If it is found that the predetermined stabilized state can not yet be attained, program control returns to step 103 and the processing is repeated. At this time, calculated data for the normal are cleared at the step 123.

Method for Generating a Smooth Surface Using a Node Group in a Mesh

Figure 6:
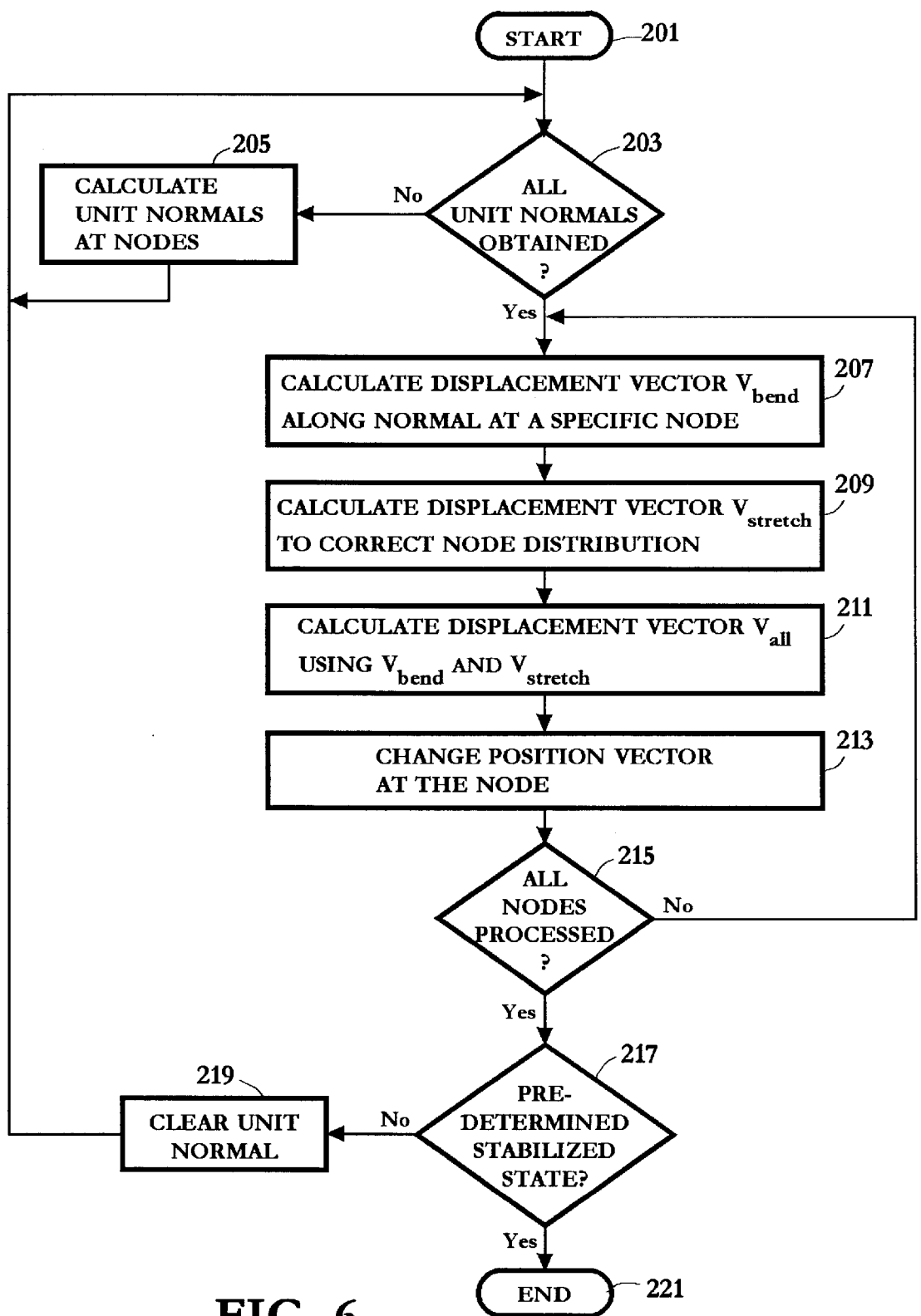
FIG. 6 is a flowchart showing the processing for generating a smooth surface.

The position information for node group $P_i$ (i=1, ... n) in a mesh is stored in the storage device. Although various mesh generation methods are available, a method disclosed in Japanese Patent No. 2603902 can be employed. FIG. 6 is a high-level flowchart of a method for generating a smooth surface using a node group in a mesh.

This processing is roughly divided into three processing portions. The portion at steps 203 to 205 is provided for the calculations for a normal, that at steps 207 to 215 is provided for the node position change segment, and that at steps 217 to 219 is provided for the termination control. This division of the flowchart functions is presented merely as an example. The node position change portion may be divided into steps 207 to 213 and step 215 which may be employed for controlling the steps 207 to 213.

First, the normal calculation portion will be described. In case of a surface, only one normal is used. First, it is checked whether all the unit normals have been acquired (step 203). So long as all the unit normals at the nodes have been designated as constraint conditions in advance, the decision at step 203 is negative the first time. Thus, at step 205 the unit normals for the nodes are calculated. The processing performed at step 205 is repeated until unit normals have been obtained for all the nodes. As the unit normals are obtained, they are stored in the storage device.

Figure 7:
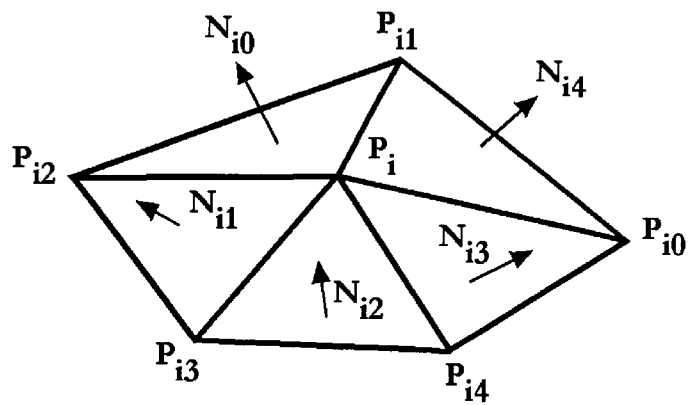
FIG. 7 is a diagram for explaining a displacement vector.

Specifically, an explanation will be given for the method for the calculation of the unit normals for the nodes (step 205). Since a surface to be processed is expressed as a mesh which is a discrete model, a precise normal at a node can not be obtained. Therefore, for each node, adjacent nodes are employed to calculate a pseudo-normal. Each time the processing is repeated, the obtained unit normal more nearly approximates the actual unit normal of a smooth surface that will be generated. As shown in FIG. 7, normals $N_{i0}$ to $N_{i4}$ (generally $N_{im}$) for the mesh elements (which in FIG. 7 are triangles, but may be n-sided polygons, with n being a positive integer), which are formed by node $P_i$ and its adjacent nodes $P_{i0}$ to $P_{i4}$ (generally $P_m$), are calculated. It should be noted that the lengths of the normals $N_{i0}$ to $N_{im}$ are proportional to the dimensions of the elements. The normal $N_i$ at node $P_i$ is represented as follows by using the normals $N_{i0}$ to $N_{im}$:

$$N_i=(N_{i0}+ \ldots +N_{im})/(|N_{i0}+ \ldots +N_{im}|)$$

The number of the elements that are formed by node $P_i$ and the adjacent nodes is generally defined as m. The normals $N_{i0}$ to $N_{i4}$ may be calculated as, for example, unit vectors, and thereafter the normal $N_i$ may be calculated using the above equation.

The above calculation is not performed for nodes for which the unit normals themselves have been designated as constraint conditions. If a face whereon the unit normal can exist is designated as a constraint condition, the tentative unit normal is calculated by employing the above calculation, and the vector after the tentative normal is moved the shortest distance to the designated surface is used as the unit normal.

The process for the unit normal calculation portion is performed in the above described manner. In this embodiment, the process is moved to the node position change portion after the unit normals for all the nodes have been obtained. However, it is possible to calculate only normals for nodes required for the node position change portion and to thereafter move to the node position change portion.

The node position change portion will now be explained. A displacement vector $V_{bend}$ along the normal at a specific node $P_i$ is calculated (step 207), and a displacement vector $V_{stretch}$ is calculated to correct the distribution of nodes (step 209). Vectors $V_{bend}$ and $V_{stretch}$ are used to calculate a displacement vector $V_{all}$ (step 211), and a position vector at the specific node $P_i$ is changed (step 213) and the position information for node $P_i$ is stored in the storage device. This process is repeated until all the nodes have been processed (step 215).

The individual steps will now be described in detail. First, an explanation will be given for the method for calculating the displacement vector $V_{bend}$ in the direction of the normal (step 207). While forces from the adjacent nodes $P_{i0}$ to $P_{im}$ are applied to node $P_i$, first, a displacement vector $Y_{ij}$ that is applied by the adjacent node $P_{ij}$ is calculated. This calculation is performed in the same as is the calculation for a curve, and can be represented as follows:

$$Y_{ij}=(K_j|P_{ij}-H_{ij}|-K_i|P_i-H_i|)*N_i$$

If $K_i=K_i=K_j$, the above equation can be simplified as follows:

$$Y_{ij}=(|P_{ij}-H_{ij}|-|P_i-H_i|)*N_i$$

It should be noted that the line that passes through node $P_i$ and is parallel to the unit normal $N_i$ is defined as $L_i$, that the line that passes through node $P_{ij}$ and is parallel to the unit normal $N_{ij}$ is defined as $L_{ij}$, and that the points that correspond to the feet of the shortest distance between the lines $L_i$ and $L_{ij}$ are defined as $H_i$ and $H_{ij}$. Similarly, displacement vectors $Y_{i0}$ to $Y_{im}$ are calculated for all the adjacent nodes $P_{i0}$ to $P_{im}$. The displacement vector $V_{bend}$ in the direction of the normal at node $P_i$ is calculated using vectors $Y_{i0}$ to $Y_{im}$ as follows:

$$V_{bend}=(Y_{i0}+\ldots+Y_{im})/(m+1),$$

or $$V_{bend}=(Len_0 Y_{i0}+Len_1 Y_{i1}+\ldots+Len_m Y_{im})/(Len_0+Len_1+\ldots+Len_m)$$

$$Len_j=|P_i-P_{ij}|(j=0,\ldots m)$$

The second equation represents the calculation method that is weighted by using the distance from node $P_i$ to the adjacent node.

Figure 8:
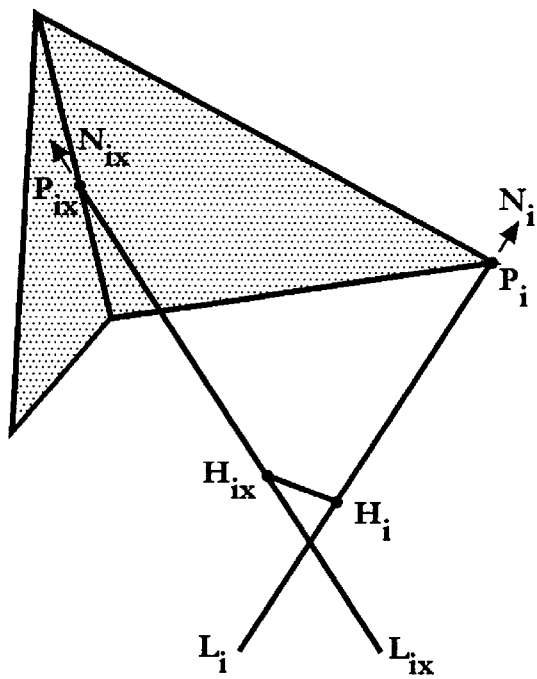
FIG. 8 is a diagram for explaining an example wherein a reference point is located on the edge of a mesh.

In the above embodiment, forces from adjacent nodes are applied to node $P_i$ in the mesh; however, the force from nodes which are not adjacent may be applied. Furthermore, instead of the node, an arbitrary point on the edges that constitute a mesh can be selected as a reference point $P_x$, and an elastic member can be defined for the reference point $P_x$. That is, the normal at the reference point $P_x$ is obtained, and points that correspond to the feet of the shortest distance between the line $L_i$ and the line that is parallel to the normal and that passes through the reference point $P_x$ are employed to calculate displacement vector $Y_{ix}$ using the above equation (see FIG. 8). The average obtained for the normals of the mesh elements that are located at both side of the edge of the mesh may be employed as the normal. Vector $V_{bend}$ can be obtained in the same manner as was vector $Y_{ij}$ for adjacent nodes.

An explanation will now be given for a method for calculating the displacement vector $V_{stretch}$ for correcting the distribution of nodes (step 209). As only a change in the node position is repeated in accordance with the displacement vector $V_{bend}$, the distribution of nodes becomes non-uniform. Therefore, the displacement vector $V_{stretch}$ is perpendicular to both the normal for a node and to vector $V_{bend}$. As for node $P_i$, the displacement vector $V_{stretch}$ is so calculated that node $P_i$ moves to the center of gravity of a polygon that is formed by the adjacent nodes $P_{i0}$ to $P_{im}$. This vector is represented as follows:

$$V_{stretch}=V_{c0}-V_{c1}$$

wherein $$V_{c0}=(P_{i0}+\ldots+P_{im})/(m+1)=P_i,$$

and $$V_{c1}=dot(V_{c0},N_i)*N_i$$

If a roughly smooth surface is already formed by the initial arrangement of the nodes, displacement vector $V_{stretch}$ may not be calculated.

To calculate a displacement vector $V_{all}$ (step 211), vectors $V_{stretch}$ and $V_{bend}$ are merely added together. In other words, $V_{all}=V_{stretch}+V_{bend}$.

A node may be added or deleted to correct the distribution of the nodes. If, for example, the distance between a specific node and its adjacent node is equal to or greater than a specific value, one node is added between them. If the distance between a specific node and its adjacent node is equal to or smaller than a specific value, either node may be deleted.

A position vector for node $P_i$ is determined by adding vector $V_{all}$ to the original position vector (step 213). The position vector obtained through the process performed in the node position change portion is stored in the storage device. It should be noted, however, that since the original position vector is also used to calculate a new position vector for another node, it must be retained in storage until all the nodes have been processed.

A method for using a new position vector for node $P_i$, instead of using the original position vector at node $P_i$, may be employed to calculate a new position vector at another node. In this case, it may be better to re-calculate the normal.

The control portion of the node position change is executed at step 215. Specifically, it is check whether the processing (steps 207 to 213) has been performed for all the nodes. If the process has not yet been completed for all the nodes, program control returns to step 207 to perform the process for the other nodes. If the process has been performed for all the nodes, program control advances to the termination control portion. For some nodes, the coordinates of the nodes are designated as the constraint condition. In such nodes, the node position change process is not performed, and the designated coordinates are used as the position of the node. It should be noted that, for the position constraint condition, there are designation methods having zero degrees of freedom, having one degree of freedom, and having two degrees of freedom. According to the designation method having zero degrees of freedom, the coordinate value is designated as the position of a node, and as described above, the node position change portion is not required. According to the designation method having one degree of freedom, since a line along which the node can exist is designated, the position of the node is calculated by using the previously mentioned method, and the point that is located on the designated line and is the closest to the calculated position of the node is calculated. According to the designation method having two degrees of freedom, since a face (a plane or a curved surface) whereon the node can exist is designated, the position of the node is calculated by the above described method, and a point that is located on the designated face and is the closest to the calculated position of the node is obtained.

Finally, an explanation will be given for the termination control portion of the processing, i.e., steps 217 and 219. While the processing is to be terminated if a predetermined stabilized state is detected, there are various methods by which the stabilized state can be detected. Basically, the repetitive processing is terminated if the moving distance for the node is equal to or smaller than a predetermined value. Either the minimum value, the average value, or the maximum value for the distances between node $P_i$ and the adjacent nodes $P_{i0}$ to $P_{im}$, $|P_i-P_{i0}|,\ldots,|P_i-P_{im}|$ are calculated and defined as $L_i$. Also, $D_i=|V_{all}|$ is calculated, and $D_i/L_i$ is obtained for each node $P_i$. The result represents the moving distance for each node that is normalized by using the distance between the nodes. If the maximum value or the average value of the normalized distances is equal to or smaller than a threshold value, the processing is thereafter terminated. This process is employed only as an example, and another method can be used to determine the stabilized state.

If the stabilized state is not detected, program control returns to step 203. At this time, at step 219 normal data are cleared in advance.

Figure 9:
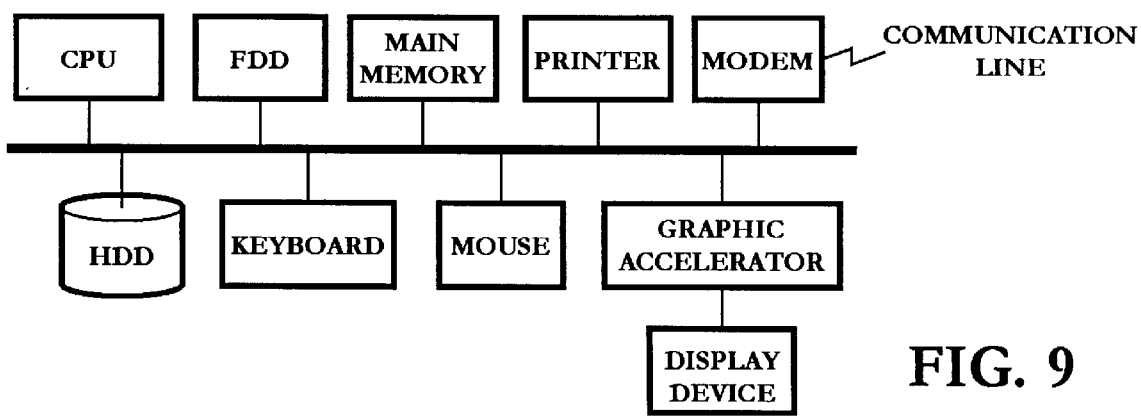
FIG. 9 is a diagram showing the arrangement of an ordinary computer.

The processing for the present invention has been explained. This processing for the present invention can be implemented by a computer program that can be executed by a computer system such as shown in FIG. 9, for example. In this case, a computer program and necessary data are stored on a hard disk drive HDD, and as needed, are loaded into a main memory and executed by a CPU. The results of the processing (including intermediate data) are also stored in the main memory. The data may be stored on the HDD as a virtual storage. The data can be supplied by a keyboard, by a storage medium, such as a floppy disk, or across a communication line connected by a communication device, such as a modem. The computer program may also be transmitted from another computer system, and may also be provided on an FD, a CD-ROM or another storage device. In the present invention, the results of the processing are used for numerical analysis by another computer program stored on an HDD. These results can also be provided for a user by a display device or a printer.

The present invention can be carried out by a dedicated device for performing the processing for the present invention. Necessary modules can be constituted by employing the method whereby the processing is divided into a normal calculation portion, a node position change portion, and a termination control portion. In addition, necessary modules can be constituted by smaller units or by larger units than are employed in the above case.

Advantageously, the present invention provides an efficient technique to generate a smooth curve or surface by changing the positions of the nodes. Further, a smooth curve or surface can be generated that satisfies a given condition, such as designation of a passing point.

We claim:

1. A method for changing positions of a plurality of nodes that constitute a curve c comprising a line or a surface, comprising the steps of:

storing in a storage device data of a normal at a node;

changing the position of said node and storing the position information into the storage device by
(1) defining a virtual elastic member connected to said node in the direction of the normal of said node, with respect to the curve c, and
(2) stretching or shrinking said elastic member in said direction of said normal; and repeating said storing step and said changing step for predetermined nodes until a predetermined condition has been satisfied, wherein in the process of stretching and shrinking said elastic member in said direction of said normal, a displacement of said elastic member is calculated by employing position information of a reference node and position information of said node, said reference node having a predetermined positional relationship with said node, and wherein in the process of stretching and shrinking said elastic member in said direction of said normal, position information of a point on a first line is also employed, wherein at said point a distance between said first line and a second line is shortest, and said first line passes said node and is parallel to said normal of said node, and said second line passes said reference node and is parallel to the normal of said reference node.

2. A method as recited in claim 1, wherein the curve c is in two dimensions and calculations of a normal of a node is in a direction perpendicular to the tangent of the line at the node.

3. A method as recited in claim 1, wherein the curve c is in three dimensions and calculations of a normal of a node utilize calculations of a primary normal and a binormal of the node.

4. The method according to claim 1, wherein a distance between said first and second lines is shortest at a point A on said first line, and a distance between said first and second lines is shortest at a point B on said second line, wherein in the process of stretching or shrinking said elastic members in said direction of each said normal, a pre-determined distance between said point A and said node and a distance between said point B and said reference node are employed.

5. A method for changing positions of a plurality of nodes that constitute a curve c comprising a line or a surface, comprising the steps of:

storing in a storage device data of a normal for each node:

changing the position of each said node and storing the position information into the storage device by
(1) defining a virtual elastic member connected to each said node in a direction of said normal of each said node, with respect to the curve c, and
(2) stretching or shrinking said elastic members in said direction of each said normal so as to balance each said elastic member; and repeating said storing step and said changing step until a predetermined condition has been satisfied, wherein a first line passes a certain node and is parallel to the normal of said certain node, and a second line passes a specific node and is parallel to the normal of said specific node, and a distance between said first and second lines is shortest at a point A on said first line, and a distance between said first and second lines is shortest at a point B on said second line, wherein in the process of stretching or shrinking said elastic members in said direction of each said normal, a distance between said point A and said certain node and a distance between said point B and said specific node are employed.

6. An apparatus for changing positions of a plurality of nodes that constitute a curve c comprising a line or a surface, comprising:

first means for storing in a storage device data of a normal of a node, with respect to the curve c;

second means for changing the position of said node and storing the position information into the storage device by
(1) defining a virtual elastic member connected to said nodes in the direction of the normal of said node, and
(2) stretching or shrinking said elastic member in said direction of said normal; and a controller for operating said first and second means for predetermined nodes until a predetermined condition has been satisfied, wherein the means for changing the position, calculates a displacement of said elastic member for use in stretching or shrinking said elastic member in said direction of said normal, the second means employing position information of a reference node and position information of said node, said reference node having a predetermined positional relationship with said node, and wherein, position information of a point on a first line is also employed, wherein at said point a distance between said first line and a second line is shortest, and said first line passes said node and is parallel to said normal of said node, and said second line passes said reference node and is parallel to the normal of said reference node.

7. A storage medium for storing a program for changing positions of a plurality of nodes that constitute a curve c comprising a line or a surface, said program comprising the steps of:

storing in a storage device data of a normal of a node, with respect to the curve c;

changing the position of said node and storing the position information into the storage device by
(1) defining a virtual elastic member connected to said nodes in the direction of the normal of said node, and
(2) stretching or shrinking said elastic member in said direction of said normal; and repeating said storing step and said changing step for predetermined nodes until a predetermined condition has been satisfied, wherein in the process of stretching and shrinking said elastic member in said direction of said normal, a displacement of said elastic member is calculated by employing position information of a reference node and position information of said node, said reference node having a predetermined positional relationship with said node, and wherein in the process of stretching and shrinking said elastic member in said direction of said normal, position information of a point on a first line is also employed, wherein at said point a distance between said first line and a second line is shortest, and said first line passes said node and is parallel to said normal of said node, and said second line passes said reference node and is parallel to the normal of said reference node.

* * * * *